United States Patent [19]

Verlohr

[11] Patent Number: 4,823,374
[45] Date of Patent: Apr. 18, 1989

[54] TELEPHONE EXCHANGE SYSTEM WITH PERFORMANCE FEATURES ACTIVATABLE FROM AN AUTHORIZED SUBSCRIBER STATION

[75] Inventor: Axel Verlohr, Munich, Fed. Rep. of Germany

[73] Assignee: Siemens Aktiengesellschaft, Berlin and Munich, Fed. Rep. of Germany

[21] Appl. No.: 218,465

[22] Filed: Jul. 11, 1988

Related U.S. Application Data

[63] Continuation of Ser. No. 766,988, Aug. 19, 1985, abandoned.

[30] Foreign Application Priority Data

Aug. 28, 1984 [DE] Fed. Rep. of Germany ....... 3431614

[51] Int. Cl.⁴ ............................................. H04M 3/42
[52] U.S. Cl. ........................................ 379/67; 379/84; 379/201; 379/396
[58] Field of Search .................. 379/88, 89, 67, 201, 379/84, 207, 87, 396

[56] References Cited

U.S. PATENT DOCUMENTS

| | | | |
|---|---|---|---|
| 3,793,487 | 2/1974 | Kilby | 379/74 |
| 4,313,035 | 1/1982 | Jordan et al. | 379/207 |
| 4,376,875 | 3/1983 | Beirne | 379/88 |
| 4,475,189 | 10/1984 | Herr et al. | 370/62 |
| 4,600,809 | 7/1986 | Tatsumi et al. | 379/88 |
| 4,602,129 | 7/1986 | Matthews et al. | 379/88 |

FOREIGN PATENT DOCUMENTS 0162364 8/1985 Japan ....................................... 379/89

Primary Examiner—Thomas W. Brown

[57] ABSTRACT

Ordinary telephone sets comprising a signaling key are employed as subscriber stations in a memory-programmed telephone exchange system. Those information which respectively characterize the performance features to be activated are stored. Depending on the existence of specific switching states, the information with respect to the first of the performance features applicable thereto are transmitted to the subscriber station on the basis of the actuation of the signal key and are indicated there in a sensorally perceptible fashion as a statement regarding the respective performance feature. This indication is meaningfully comprised of the announcement of the performance feature. The memory storing the announcements, consequently, is part of a voice output device. Those voice announcements which state the performance features or services which can be activated by the subscriber are communicated to the subscriber. When the subscriber actuates the signal key during an announcement or in a short time interval prescribed subsequent thereto, the assigned performance feature is activated. Insofar as a further key actuation is omitted during this time interval, a next possible performance feature is automatically announced to the subscriber. The end of a prescribed time interval is rendered perceptible by an attention character.

5 Claims, 1 Drawing Sheet

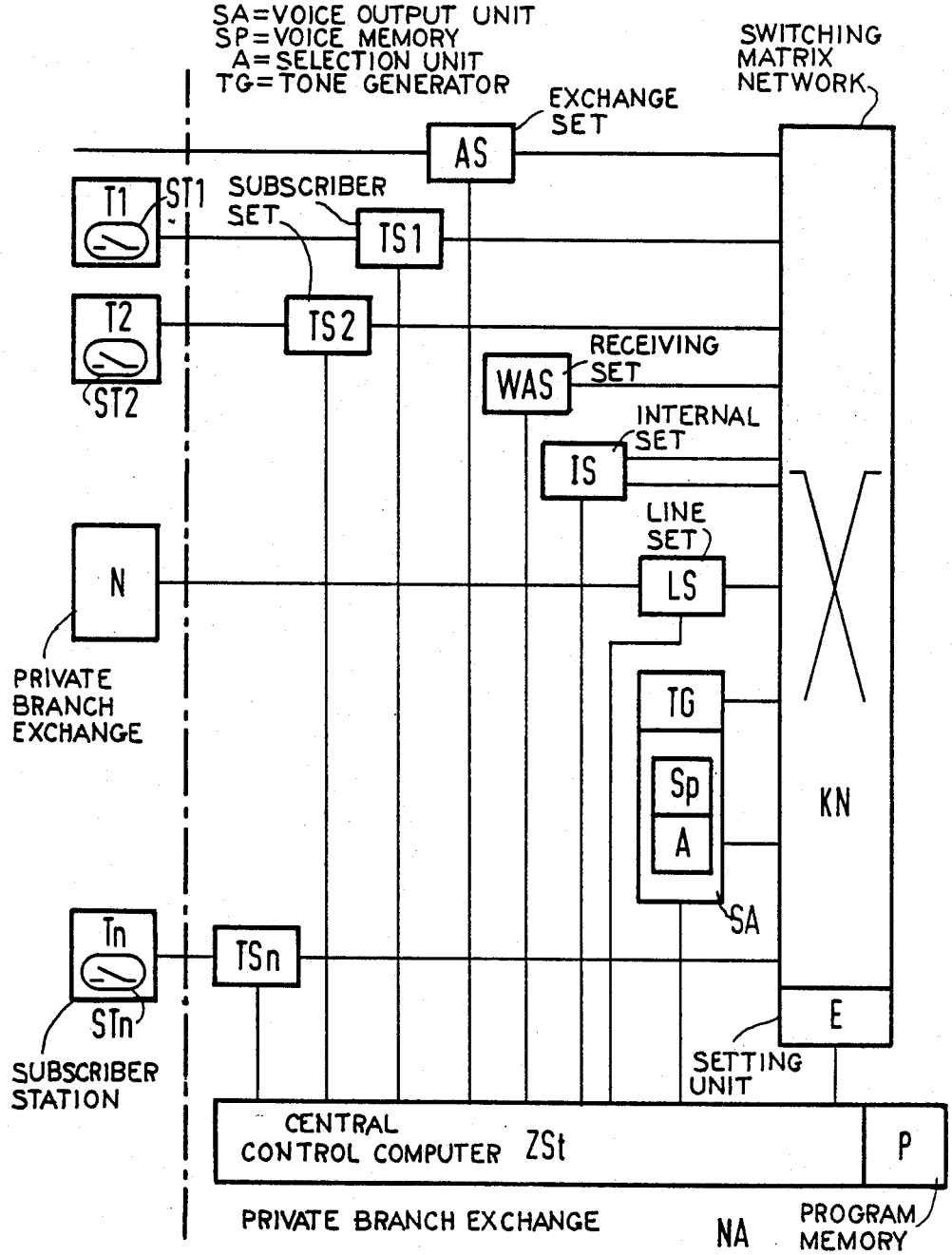

TELEPHONE EXCHANGE SYSTEM WITH PERFORMANCE FEATURES ACTIVATABLE FROM AN AUTHORIZED SUBSCRIBER STATION

This is a continuation of application Ser. No. 766,988 filed Aug 19, 1985 now abandoned.

BACKGROUND OF THE INVENTION

1. Field of the Invention

The present invention relates to a method for a program-controlled telephone exchange system, particularly a private automatic branch exchange, comprising a control computer unit sequencing all exchange operations which has access to corresponding memory arrangements in which the information required therefor are stored, whereby various performance features, in conjunction with voice connections already existing, are to be set up, are activatable from a respectively authorized subscriber station.

2. Description of the Prior Art

In current telephone exchange systems, a telephone subscriber can lay claim to specific performance features from his own telephone station, and a number of performance features can be expanded by utilizing semiconductor memories and control computer units. Such performance features relate, for example, to call protection, to automatic call back, to rerouting, for offering or for a conference connection. Such services can be requested, even given seizure of the exchange devices, or can also be requested during an existing call connection. It is known to request service requests by dialing defined numbers or, respectively, code digit sequences, which differ from one another. This is involved and, particularly given long digit sequences to be augmented by check identifiers, there is a risk of faulty inputs. Another possibility of activating individual services consists of actuating specific procedure keys. Expensive special telephone stations are required in order to provide such procedure keys. If additional services are to be enabled, then the number of procedure keys would have to be correspondingly increased. This, however, would not only lead to a higher price but the easy surveyability of the existing key field would also thereby be lost.

SUMMARY OF THE INVENTION

The object of the present invention is to simplify the recourse to services, particularly in view of future expansions.

The above object is achieved in that those information which respectively characterize the performance features to be activated are stored in a memory; in that, dependent on the existence of the defined switching state, the information regarding the first of the performance features applicable thereto is transmittable to the telephone station on the basis of a simple signal transmission occurring at the telephone station and is indicated thereat in a sensorily perceptable fashion as a statement regarding the performance feature; in that, insofar as the same signal transmission respectively occurs again within a prescribed time interval, the successor functions corresponding to the indicated performance feature are initiated by the control computer unit; and insofar as a further, identical signal transmission is lacking in this time interval, a next possible performance feature is respectively automatically indicated at the telephone station.

Due to the signal transmission which, for example, can be undertaken by the actuation of one and the same signal key or by brief actuation of the cradle switch, therefore, the subscriber can be informed of the services he can activate in the appertaining switching situation. Ordinary telephone sets can therefore be employed for this purpose since the same can occur in the same manner as the activation of one of the indicated services by a single key or, depending on the exchange system, also without a signal key by means of a momentary actuation of the cradle switch. In addition to an operating facilitation, the method of the invention also achieves a high reliability in the activation of a service. The indication thereby advantageously occurs in the form of an immediate statement regarding the respective service or, respectively, regarding the performance feature.

A particularly advantageous development of the invention is that the memory is a component of a voice output unit and the possible performance features are stored therein as the terms characterizing these features. The performance features respectively applying for the appertaining switching states are then transmitted to the respective subscriber station as voice information and are immediately announced at the subscriber station. Ordinary telephone sets can therefore be employed without any auxiliaries whatsoever. The central control computer respectively enables that voice message which announces the service activatable by the subscriber. Given an acoustical indication, the forwarding of the information characterizing the performance feature is possible without disruption on a normal subscriber line in an extremely simple manner.

It can be provided that the end of a time interval respectively prescribed in an indication is made perceptible by an attention character. This attention character can represent the indication of the performance feature which itself can be called in as the next performance feature.

BRIEF DESCRIPTION OF THE DRAWING

Other objects, features and advantages of the invention, its organization, construction and operation will be best understood from the following detailed description, taken, in conjunction with the accompanying drawing on which there is a single figure showing a block diagram illustration of apparatus for carrying out the present invention.

DESCRIPTION OF THE PREFERRED EMBODIMENTS

Fundamentally, the method of the present invention can be applied both in a public telephone exchange system and in a private telephone exchange system. This is possible in analog systems as well as in digital exchange systems. The exemplary embodiment illustrates some function units of an analog, memory-programmed private branch exchange NA whose control sequences are essentially controlled by the central control computer ZSt. The block circuit diagram illustrates the connector sets provided for standard traffic, namely an exchange set AS, an internal set IS, a receiving set WAS provided for receiving dial information output in multifrequency methods, and a line set LS to be employed given a connection to a further private branch exchange N. These connector sets and, under given conditions, a sub-central control unit (not shown) can be present in combination with a corresponding part of the switching matrix network KN and the respective switching matrix array setting unit E for a specific group of subscriber stations T1—Tn. When a plurality of these subscriber group are formed, then the groups are assigned to the units in a corresponding manner. A subscriber set TS is provided for a subscriber station T in every subscriber group, the subscriber sets TSl—TSn in the exemplary embodiment. In a manner which is not indicated, this respectively contains, among other things, an indication location which recognizes status changes on the respective central office line. The individual information are accepted by the central control computer ZSt. Setting instructions for the function switches contained in the subscriber set are then communicated from the central control computer ZSt. This is also true in the same fashion for the remaining connector sets. The respective connector set is thereby marked via an address information. The type of actuation of a function switch is defined on the basis of a setting information and the appertaining function switch is selected at the same time. The respective setting thereof is then executed by the clock information of the existing system clock.

In the exemplary embodiment, the subscriber-associated or, respectively, connection-associated sets are connected with equal priority to the switching matrix network connections of only a single switching matrix network side in the so called reversal grouping. The exchange-oriented switching events required for the set up, the holding and for clearing a connection directly at the switching matrix network are executed by the connector sets. The programs necessary for the individual control sequencing should be contained in the program memory P to which the control computer has access.

The first digit dialed in by a subscriber is evaluated by the control computer ZSt and a determination is made as to whether an integral connection or an external connection is desired. In the latter case, the further set up would then occur given the assistance of an exchange set AS. When an internal connection is desired, then a routing to the desired subscriber is sought. The setting unit E is indicated t undertake the setting of the appertaining switching contacts in the switching matrix network KN. When the matrix path is in proper order, then the through-connection occurs and the internal set IS transmits the free tone to the calling subscriber and the call signal to the called subscriber. When the calling subscriber station is equipped with a pushbutton dial set, then the set WAS present for receiving dial information input with the dial set is released. Entry into the call condition then occurs when the subscriber answers. When one of the participating subscribers hangs up, then, on the basis of corresponding instructions, this effects the release of the subscriber set TS and the established route.

The subscriber of a modern telephone exchange system can call in specific performance features. These service requests could be respectively undertaken by dialing specific code digits or, respectively, code digit sequences. However, a high probability of error exists, particularly due to possible digit mix-ups. Given a telephone station having a pushbutton dialing unit, an additional procedure key could also be provided for each of the possible performance features. For reasons of surveyability and of expense, however, only a limited number of requests possibilities can be set up simultaneously. Furthermore, it is also difficult to enable changes.

It is now to be provided that a so-called user guidance on the basis of a corresponding voice announcement occurs for the recourse to services or, respectively, to performance features. For this purpose, the exchange system NA contains a voice output unit SA. The performance features possible in the exchange system are respectively stored as word concepts in its voice memory Sp. The word concepts can be respectively stepped out by way of a selection unit A depending on the information supplied by the control computer ZSt and can be transmitted to the appertaining subscriber station as analog voice information. This transmission of a word identifying a performance feature and the activation of the performance feature is initiated by the actuation of one and the same signal key ST present at the telephone station. Fundamentally, therefore, an ordinary telephone set having only one signal key can be employed. The subscriber then makes his wish to activate a service known by actuating the signal key ST. The exchange system then connects the subscriber to that voice announcement which states those services which are meaningful in the appertaining switching state. When the subscriber then actuates the signal key during such announcement or during a prescribed, following short time interval, then the assigned service is activated. Given a telephone station having a display and a single signal key, it would be possible to optically indicate the respective service by displaying the appertaining word at the display instead of providing the services by way of announcements. It is also conceivable to assign a unit to a telephone station by means of which an information determining the service is converted after being communicated to the subscriber station such that the concept identifying the appertaining service can be acquired via the sense of touch.

As an example, let it be assumed that a call is conducted proceeding from the subscriber station T1 to the subscriber of the subscriber station Tn. When, for example, the subscriber of the subscriber station T2 dials the subscriber station T1, then the exchange system for which the busy signal to the subscriber station T2. In such an exchange-oriented state, various performance features should now be capable of being called in. When the subscriber, since he urgently wishes to speak to the subscriber of the subscriber station T1, actuates the signal key, then the actuation is perceived by the control computer ZSt via the subscriber circuit TS2. The first of the possible performance features is now announced. Controlled by the control computer, the word "call back" is now announced to him as an analog voice information from the voice memory Sp. He could now actuate the signal key ST2 at his subscriber station and therefore program an automatic call-back in the exchange system when the subscriber station T1 becomes free. Since he wishes to talk to the subscriber of the subscriber station T1 immediately, he omits the actuation of the signal key. After the lapse of a short time interval, whose lapse is announced for example by an applied call progress tone, the announcement of the performance feature which is further possible in this switching situation occurs. The concept "offering" is therefore announced to the subscriber by stepping the same out of the voice memory Sp. When the subscriber at the subscriber station T2 then actuates the signal key ST2 during the following, prescribed short time interval, then the same is perceived by the control computer ZSt via the subscriber station TS2. This then leads to the activation of the performance feature "offering".

The subscriber of the subscriber station T2 can therefore enter into the call connection existing between the subscribers of the subscriber station T1 and the subscriber station Tn. The subscriber stations are interconnected in a three's conference. The subscriber of the subscriber station T2 now has the possibility of informing the two other subscribers of the urgency of his wishes to talk and to ask that they end the conversation.

As a further example, let the case be mentioned that the subscriber of the subscriber station T1 should be in consultation with the subscriber of the subscriber station T2. The subscriber station Tn participating in the original conversation is placed on hold. In this exchange-oriented state, the signal key ST1 present at the subscriber station T1 is now actuated at the subscriber station. The voice announcement of a performance feature which would be activatable in this state now occur to the subscriber station. For example, the word "conference" contained in the voice memory Sp is announced. A brief time interval in which this performance feature could be activated now follows. The end of the time interval can be announced by a tone which, for example, is supplied by a tone generator TG. This can be a call progress tone generator already present in the system. When the signal key is not activated again by the subscriber of the subscriber station T1 in the fixed time interval, then a next possible performance feature, namely the performance feature "break in" is announced. When the subscriber of the subscriber station T1 now actuates the signal key, he is then connected with the subscriber of the subscriber Tn. By means of following actuation of the signal key, the subscriber of the subscriber station T1 can break in between the subscribers of the subscriber stations T2 and Tn. He can therefore change between the various simultaneously existing connections as frequently as he desires.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably be included within the scope of my contribution to the art.

I claim:

1. A method of providing performance features during a call or the set up of a call connection in a program-controlled telephone exchange system, comprising the steps of:
    storing in a memory of plurality of information corresponding to all performance features which may be activated;
    activating a single signal switch in a subscriber station to transmit a request signal for performance feature service;
    recognizing the request signal in the exchange system and the calling state of the subscriber and sequentially reading the memory and transmitting performance feature signals available to the subscriber in that calling state as sensorily perceptible information with each transmission followed by a predetermined time interval;
    sequentially and symbolically displaying the performance features at the subscriber station in response to the performance feature signals; and
    activating the single signal switch symbolically displaying a performance feature during the following predetermined time interval to actuate the exchange system to provide the corresponding service to the requesting subscriber.

2. The method of claim 1, wherein the memory is a portion of a voice output unit and the step of transmitting performance feature signals is further defined as: transmitting voice signals as the performance feature signals.

3. The method of claim 1, and further defined by the step of:
    transmitting an attention character to the subscriber station at the end of the predetermined time interval.

4. The method of claim 1, wherein the steps of activating a signal means are further defined as: operating a signaling key.

5. The method of claim 1, wherein the steps of activating a signal means are further defined as: operating a cradle switch of the subscriber station.

* * * * *